Figure 1:
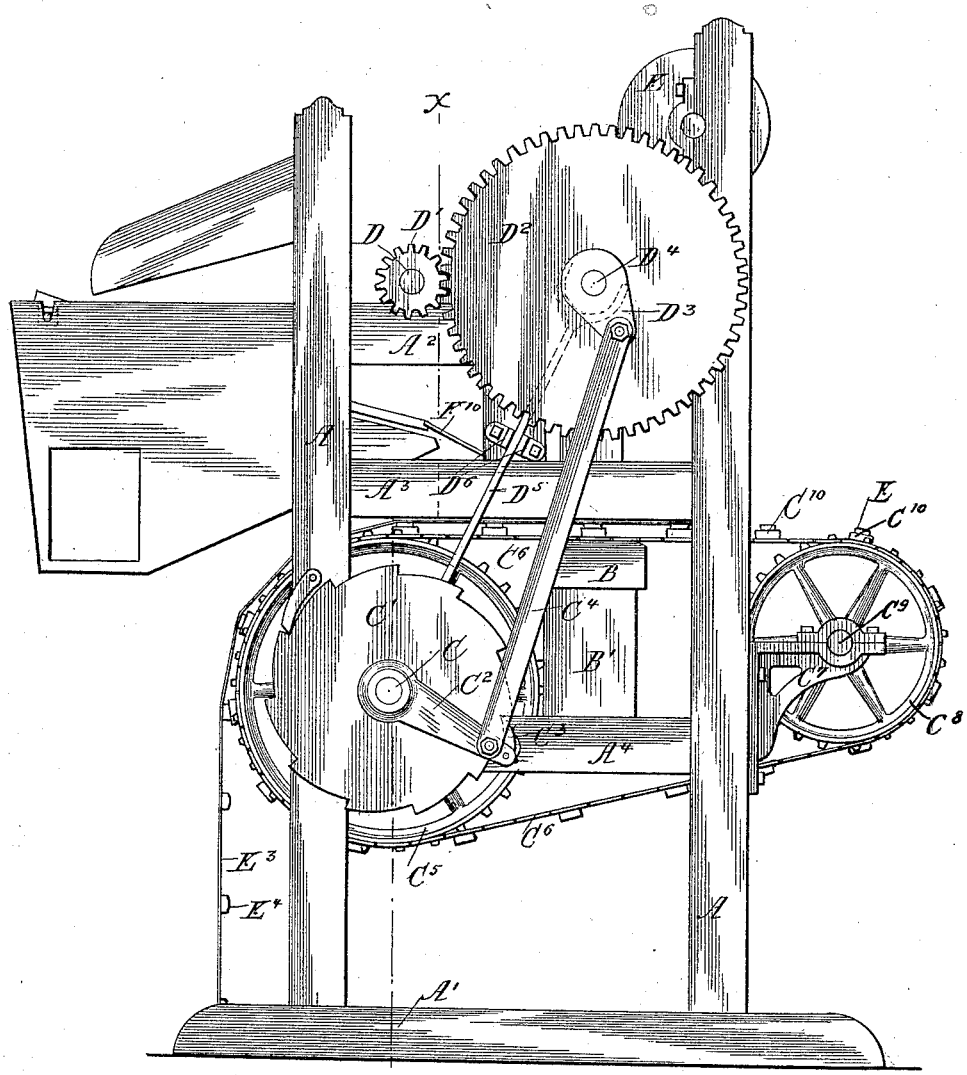

(No Model.)  5 Sheets—Sheet 1.

J. F. KINGWILL.
MACHINE FOR MANUFACTURING HARVESTER CONVEYER BELTS.

No. 452,972.  Patented May 26, 1891.

(No Model.) 5 Sheets—Sheet 2.
J. F. KINGWILL.
MACHINE FOR MANUFACTURING HARVESTER CONVEYER BELTS.
No. 452,972. Patented May 26, 1891.
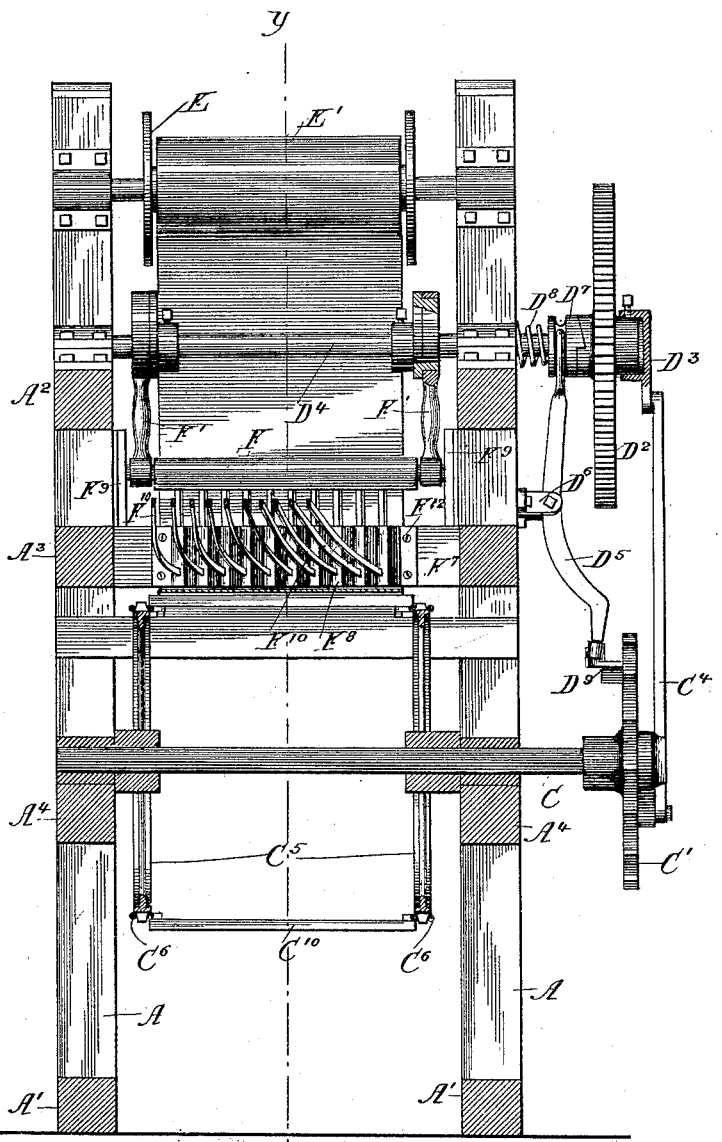

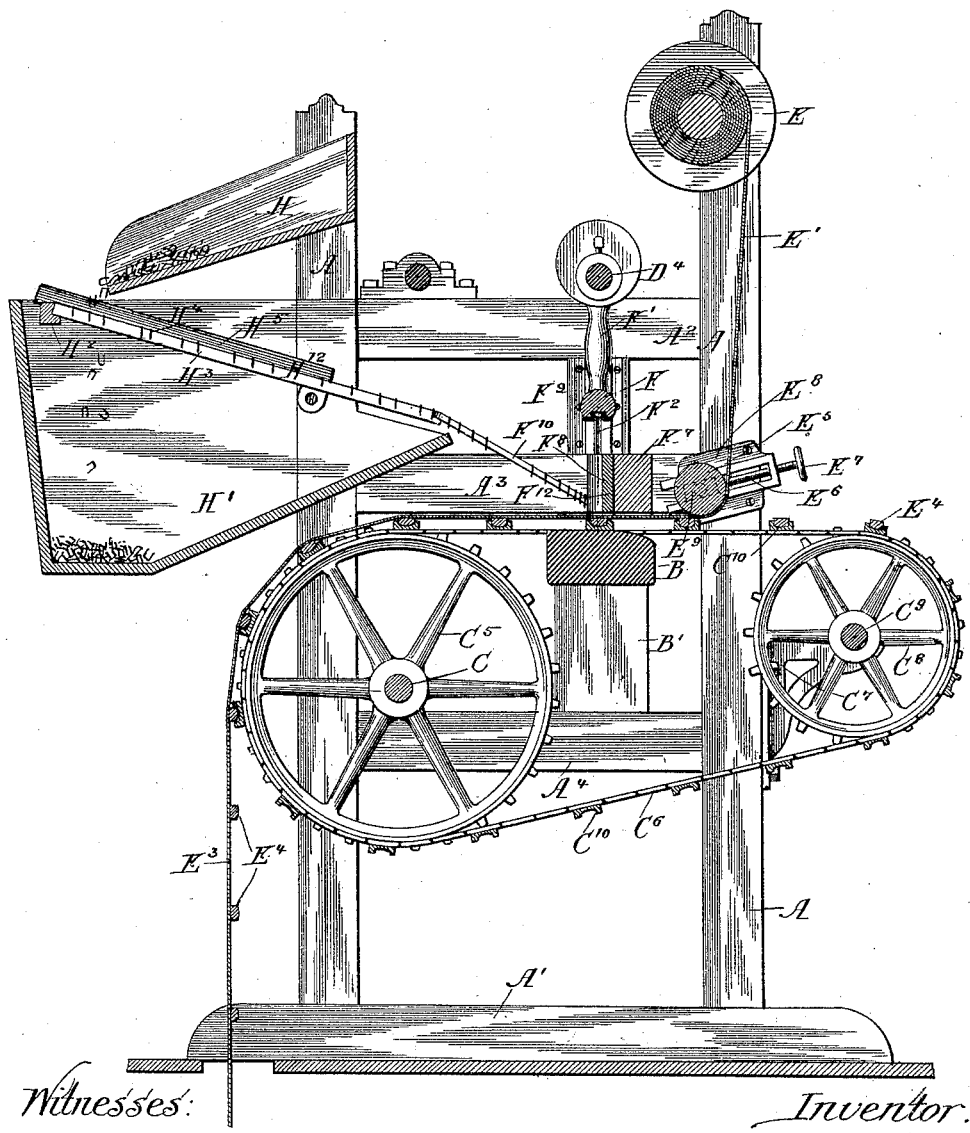

(No Model.) 5 Sheets—Sheet 4.
J. F. KINGWILL.
MACHINE FOR MANUFACTURING HARVESTER CONVEYER BELTS.
No. 452,972. Patented May 26, 1891.
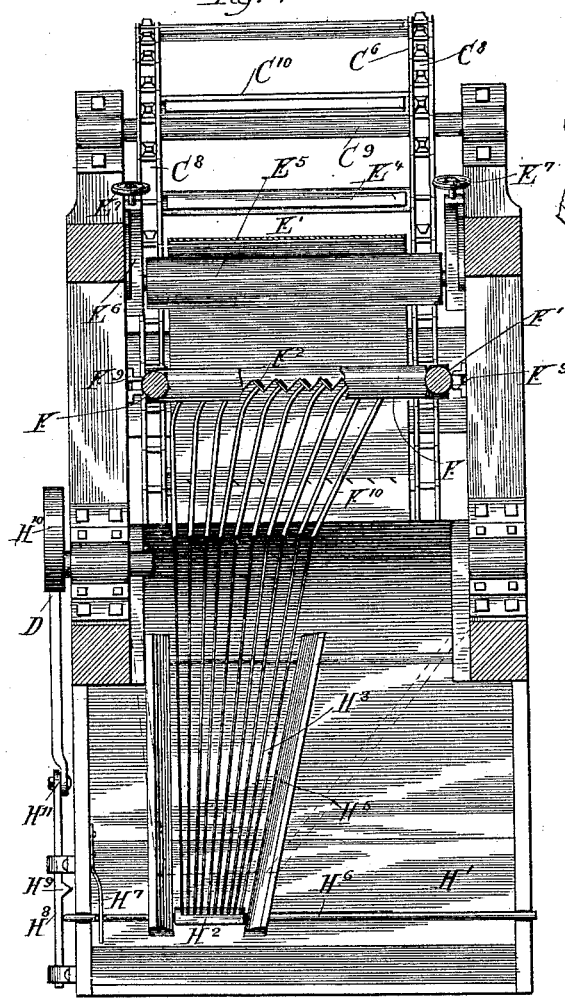
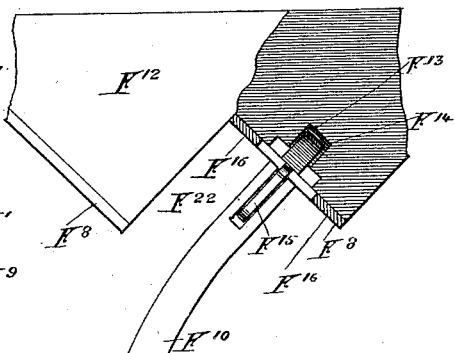
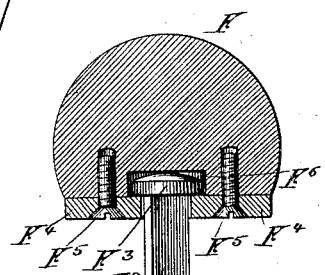
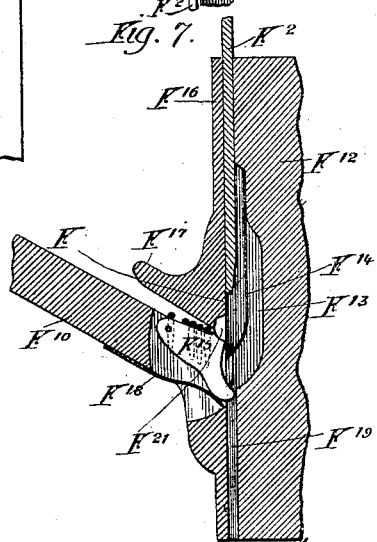
Witnesses:
Frank S. Blanchard
William F. Kinners
Inventor:
John F. Kingwill
By Francis W. Parker,
Attorney (No Model.) 5 Sheets—Sheet 5.

J. F. KINGWILL.
MACHINE FOR MANUFACTURING HARVESTER CONVEYER BELTS.

No. 452,972. Patented May 26, 1891.

Witnesses
John M. Culver.
A. D. Wells.

Inventor
John F. Kingwill.
By his Attorneys
Parkinson & Parkinson ically*m
UNITED STATES PATENT OFFICE.

JOHN F. KINGWILL, OF CHICAGO, ILLINOIS, ASSIGNOR TO THE McCORMICK HARVESTING MACHINE COMPANY, OF SAME PLACE.

MACHINE FOR MANUFACTURING HARVESTER CONVEYER-BELTS.

SPECIFICATION forming part of Letters Patent No. 452,972, dated May 26, 1891.

Application filed March 1, 1886. Renewed August 16, 1887. Serial No. 247,097. (No model.)

*To all whom it may concern:*

Be it known that I, JOHN F. KINGWILL, a citizen of the United States, residing at Chicago, in the county of Cook and State of Illinois, have invented certain new and useful Improvements in Machines for Securing the Slats to Canvas Belts or Carriers such as Used on Harvesters, and for similar purposes, of which the following is a specification.

The platform and elevator carriers of modern harvesters consist, as a rule, of wide belts or endless aprons of canvas having tacked, nailed, or riveted to their outer or exposed faces at suitable intervals long transverse slats of wood, that a proper grip may be taken upon the stalk of the grain as it is carried sidewise toward the delivery end of the harvester. The ends of a carrier are not stitched together, but overlap and are united by straps and buckles, that they may be properly tightened upon their drums and all slack or sag taken up. Since these ends overlap, a slat is usually omitted from its measured space at one end; otherwise it would be covered by the other end or interfere with the properly-placed slat upon that end when the two ends are drawn together. Heretofore such slats have been applied to the canvas web by hand, involving a tedious, laborious, and expensive operation.

The present invention has for its object to perform this service automatically; and to this end it embraces, primarily, the combination of a conveyer, whereby slats are fed and positioned at suitable intervals, a drum supporting a roll of canvas, and from which said canvas is drawn concurrently with the movement of the slat-conveyer, a gang of tack or rivet feeders, and a gang of drivers, whereby said tacks or rivets are forced through the canvas and previously-positioned slat. It further embraces various other combinations and details of construction hereinafter described and claimed.

Figure 8:
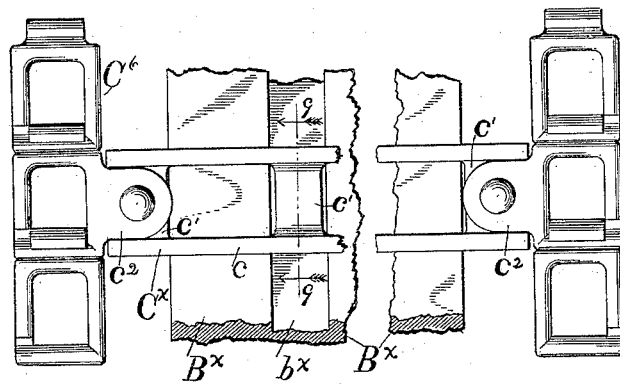
Figure 10:
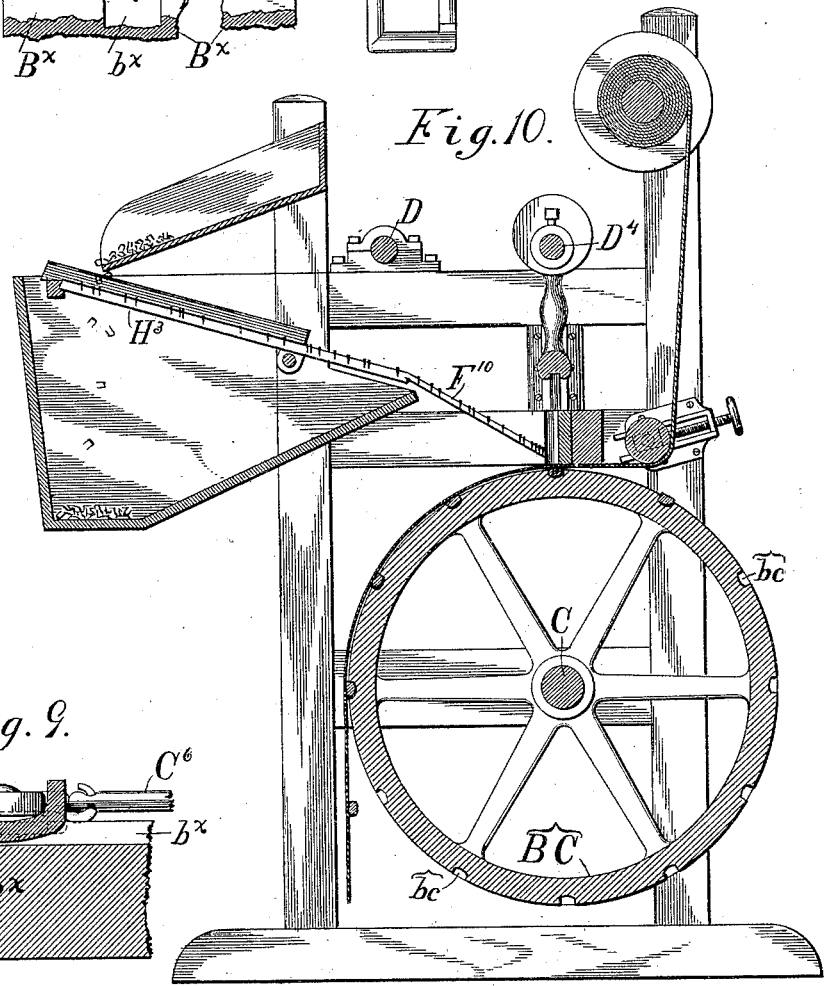
Figure 9:
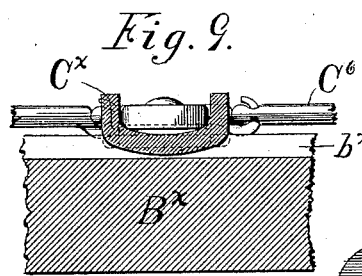

In the drawings, Figure 1 is a side elevation of a machine embodying said invention; Fig. 2, a vertical transverse section therethrough on the line $x\ x$ of the preceding figure and looking from the rear; Fig. 3, a vertical longitudinal section on the line $y\ y$ of Fig. 2 and looking from the right-hand side thereof; Fig. 4, a top plan view partly broken away and partly in horizontal section to more clearly expose the underlying mechanism; Fig. 5, an enlarged detail showing a portion of a tack-feeder and a horizontal section of a part of the plunger-guide; Fig. 6, an enlarged detail in transverse section of the plunger cross-head; Fig. 7, a vertical section, enlarged, taken through a tack-feeder and co-operating plunger-guide. Figs. 8 and 9 are details in top plan and sectional view of an alternative form of the chain-slat carriers, wherein the carriers are open beneath to permit the tacks to clinch directly upon the anvil; and Fig. 10 represents in sectional elevation a modification wherein a longitudinally-channeled revolving drum performs the office of carrier and anvil.

A represents the vertical posts or uprights of a strong frame; A', the sills; $A^2$, the upper, $A^3$ the middle, and $A^4$ the lower lateral girts, of which there will be a suitable number.

B is an anvil-bed supported on the frame transversely thereof by means of brackets or standards B' and serving to support the slat-carriers at the moment that the tacks or rivets are inserted through the canvas web and slats, as will presently appear. Journaled in the lower part of the frame at one end and beneath and to one side of this bed-piece is a transverse shaft C, bearing a ratchet-wheel C' outside of the frame. $C^2$ is a radius-arm loose on this shaft just outside of the ratchet-wheel, and carrying at its free end the spring-pawl $C^3$, and also pivoted near this pawl to a pitman $C^4$, by means of which a ratchet-and-link motion is obtained. Keyed to the shaft are sprocket-wheels $C^5$, one near each end and just inside of the lateral members of the frame at the corresponding end. The slat-conveyer is composed of chains $C^6$, passing over these sprocket-wheels and also over opposing sprocket-wheels $C^8$, mounted upon a shaft $C^9$, supported in brackets $C^7$ at the opposite end of the frame, and having at suitable intervals transverse slat-carriers $C^{10}$, extending from one chain to the other and consisting of metal bars recessed or pocketed longitudinally to receive each one of the wooden slats, and these carriers, as they travel with the chains, are successively dragged over the top of the anvil-bed, whereby they are held up against the riveting mechanism. The sprocket-wheels on the first-mentioned shaft may be larger than those on the opposite or counter shaft, but will themselves be of equal diameter and have the same number of teeth, so that as the shaft is intermittently actuated by the ratchet-and-link motion the chains may move co-ordinately and therefore preserve the alignment of the slat-carriers. Instead of being simply recessed or pocketed for the reception of the slats, which involves the clinching of the rivets or tacks directly upon the bottom of the channels instead of upon the anvil-bed, these carriers may be slotted clear through, as indicated in Figs. 8 and 9, wherein $C^x$ represents a skeleton carrier of such nature—that is to say, it consists of two side bars $c$, united at the ends by webs $c'$, which may serve as a means of union with the ears $c^2$ from opposing links of the chain. If a central web should be employed to prevent springing of the bars, it may run through a channel $b^x$ in the anvil $B^x$ as the carrier sweeps over the crown of the latter, which now becomes a true anvil, since the tacks will be clinched directly upon its surface. Instead, also, of the moving chain-carrier and stationary anvil, as implied in either of the foregoing constructions, the metal drum B C, mounted upon the ratchet-wheel shaft C, (the location of which will of course be suitably changed,) and provided with longitudinal peripheral channels $b$ $c$, may serve at once as carrier and anvil, being for this purpose so arranged that its axis is vertically or thereabout beneath the plunger-gang. Slats can be fed to this drum from a table or from a pile, and the canvas may be led to it and reeled off by its revolution in the same manner as when the chain-carrier is employed.

Mounted in bearings near the top of the frame is the main driving-shaft D, having a pinion D' thereon, which meshes with and drives the gear-wheel $D^2$, loosely journaled on a shaft $D^4$, extending across the frame. On the outer hub of the gear-wheel above the before-mentioned ratchet-wheel is keyed a crank $D^3$, which receives the upper end of the link or pitman from the pawl-arm connected therewith, so that the revolutions of this gear-wheel and its crank shall actuate the ratchet-wheel. In order to intermittently unlock the gear-wheel from the shaft and leave said shaft idle with the riveting mechanism, which it drives, as hereinafter explained, a lever $D^5$ is pivoted to a bracket $D^6$ from the frame, and at its upper end has a yoke which connects with the sliding half of a clutch $D^7$, urged into engagement with an opposing clutch-face on the inner hub of the gear-wheel by means of a spring $D^8$, encircling the shaft, and at its lower or heel end is at the proper time struck by a cam-flange $D^9$ from the inner face of the ratchet-wheel, which forces it out toward said wheel, and consequently carries the upper or forked end in to shift the sliding half of the clutch and disengage the gear-wheel, thereby stopping the rotation of the shaft upon which said wheel is mounted.

Near the top of the frame and at the front end thereof is journaled the reel or drum E, which carries the roll E' of canvas to which the slats are to be applied. From this drum the canvas web is carried down beneath a tension and regulating device, herein shown as a roller $E^5$. Thence it is laid horizontally above the chains and slat-carriers and over the anvil-bed for the support of the latter, at which point the slats are secured to it by superposed riveting mechanism. Thence it passes over the outer sprocket-wheels and down in the condition of finished belting $E^3$ to any suitable receptacle. At the moment of being riveted the canvas should be in actual or practical contact with the slat, and this is accomplished either by the tension-roller $E^5$ or by the hereinbelow-described transverse plunger-guide located immediately over the anvil, either of which will serve as a guide and presser to hold the canvas down upon the slat-conveyer. In order to support the tension-roller and allow it to be adjusted, brackets $E^8$ are secured to each side of the frame and formed with longitudinal downwardly-inclined guideways, which receive sliding boxes $E^9$, wherein the gudgeons of the roller are journaled. A screw-stem $E^6$ is threaded through each bracket at the outer end of the guideway and connects with the sliding box in the respective bracket, so that when turned by means of the hand-wheel $E^7$ it may adjust said sliding box back and forth, thereby enabling either end of the roller to be moved in and out or raised or lowered to properly align it or to tilt one end beyond the other, thus controlling the canvas.

Coming now to the mechanism for feeding and inserting the tacks, F is a cross-head supported and actuated by links F', one at each end, strapped to eccentrics upon the shaft $D^4$, or that shaft which is intermittently thrown out of gear by the cam upon the ratchet-wheel, and which may hereinafter be termed the "plunger-driving shaft." A series of driving-plungers $F^2$ are connected with this cross-head at its under side by means of heads $F^3$, which, by means of straps $F^4$, secured to said cross-head, are confined in the longitudinal groove $F^6$, formed therein.

To a transverse girt $F^7$, uniting the lateral members of the frame above the slat-conveyer, but below the plunger cross-head, is secured a metallic plunger-guide $F^{12}$, having in the present instance a series of oblique vertical faces $F^8$, one to each plunger or driver, which give it a sort of staggered outline, for a purpose presently explained. Above the plunger-guide at each side of the machine are vertical ways $F^9$, in which the ends of the cross-head move as the latter is reciprocated by the cams on the overhead shaft or plunger-driving shaft. A series of curved and downwardly-inclined ways or bars $F^{10}$ abut against the rear side of the plunger-guide, one against each oblique face thereof, and consequently one to each plunger, by which the tacks, rivets, or staples are fed to said guide and plungers. Vertical guideways or plunger-ways $F^{19}$ are formed in each oblique face parallel therewith as to their width or longest diameter and about centrally thereof and opposite the delivery ends of the tack-feeders and covered by a face-plate $F^{16}$, through an opening $F^{22}$, in which the feeders deliver their load to the action of the plungers. The inner side of each plunger way or guide is slotted or recessed, as at $F^{13}$, to receive the curved spring-stops $F^{14}$ opposite the delivery end of the tack-feeders, and which press outward against such feeders, whereby each tack in succession, as it enters the way, is stopped and supported until the next descent of the plunger. These spring stops or catches may be permanently magnetized, if desired. The end of each feeder opposite the corresponding spring-catch is vertically slotted or has a rift, in which a cut-off plate $F^{15}$ is pivoted and pressed upward toward a throat-piece $F^{17}$, projecting from the face-plate above the feeder and feed-aperture by means of a spring $F^{18}$, suitably secured for the purpose. The office of this cut-off plate is to stop the flow of tacks after a single one has been delivered to the plunger-way until the succeeding descent of the plunger, then open to permit a single tack to be fed while the plunger is down and close as it rises to again shut off the flow, and to this end it is prolonged downward into a sort of tang, which projects into the plunger-way and is struck by the plunger in its descent, thus opening the cut-off when a single tack advances into a recess $F^{21}$, formed by cutting away the inner side of the face-plate and of just sufficient width to admit a single tack from the column between its own wall and the face of the plunger. As the plunger rises it releases the cut-off, and this shuts up against the throat-piece immediately behind the tack so fed, which, as soon as the withdrawal of the plunger leaves the way clear, moves on and drops against the curved stop, whereby it is held suspended in the way until the next descent of the plunger. The tacks or rivets preferably used are two-pronged staples, and therefore straddle the feed-bars as they descend from the source of supply to the plunger-gang, and that they may be properly aligned with the plunger-way or driveway in case their prongs should be swung somewhat outward therefrom while hanging suspended from the spring-stop in said way the inner face of each plunger is slightly beveled at the striking end, as at $F^{20}$, so that the outer edge of the connecting web or head of the staple may be struck first, throwing the prongs inward against the inner wall of the way.

In order to supply tacks to the tackways or feeders, the following mechanism is employed, to wit: A hopper H is secured near the top of the frame and at its rear, or that end opposite the canvas-supplying drum or reel. This hopper is open at one end and has an inclined bottom or chute, so that tacks $H^4$ poured therein may descend through the chute and pass therefrom in a stream. Vertically beneath, but at some distance from the upper hopper, is placed a lower or gathering hopper $H'$, having a closed bottom, so that the tacks or staples which reach it may be retained. Intermediate between these two hoppers is what may be termed a "tack-sorting" hopper $H^{12}$, composed of a cross-block $H^2$, to which a reciprocating or vibratory motion may be imparted, as directly explained, carrying the upper ends of the tack-collectors $H^3$, that merge into and are practically the upper ends of the feed-bars or tackways, and which gradually diverge from the reciprocating head-block down to the mouth of the hopper. These collectors are inclosed to a suitable distance from their upper ends by lateral side boards $H^5$, which flare slightly to form a trough for the reception of the tacks. The cross-block or head-block of this sorting-hopper is carried upon a rod $H^6$, supported in the opposite sides of the lower or gathering hopper and free to play therethrough, being urged into normal position by a spring $H^7$ and pushed endwise therefrom by a tappet or wiper $H^9$ on a bar $H^8$, reciprocating in bearings outside of the hopper and transversely of this rod and jointed at the point $H^{11}$, so as to be actuated by an eccentric $H^{10}$ upon the main driving-shaft. Thus a continuous shaking movement will be imparted to the collecting-hopper and the stream of tacks falling from the feed-hopper and descending upon the collecting-bars will gradually find their position thereon and travel down along the trackways to the plunger-guide, where they will be delivered, as before explained, while such of the tacks as fall through between the collecting-bars will be received in the gathering-hopper beneath and be returned therefrom to the feed-hopper by any suitable means. This mechanism for sorting and collecting the tacks upon guides or ways preparatory to feeding them to rivet mechanism I do not by itself herein claim.

In operation the upper tack-hopper is filled with tacks or staples, and the end of the canvas, previously mounted upon its reel, is brought around between the driving mechanism and the anvil-bed. The machine is started and the sorting-hopper is agitated, and a portion of the tacks are thereby sorted out and run into the collector in an upright position. Thence they travel on down the collector-bars until they pass upon the feed-bars, and thence to the tack-delivery device. At this point the column of tacks is stopped or cut off until a descent of the plunger takes place, when a single tack will be fed forward, and upon the withdrawal of the plunger will fall against the spring-stop in the driveway, while the column behind it will again be arrested by the cut-off. When the plunger next descends, it drives the tack already admitted down, but in its descent strikes the lower inner end of the cut-off, and by depressing it throws down the upper end and admits one more tack into the recess provided for that purpose. When the plunger again rises, the cut-off returns to its former position and the new tack just fed drops against the spring-stop, which, as it catches and supports it at the inner edge of its loop or head, will tend to throw its points inward or into the driveway; but in case it should not provision has been made, as already explained, whereby the plunger in its next descent will correct any misplacement. As the canvas passes between the driving mechanism and the anvil-bed, the slat-conveyer, actuated from the ratchet-wheel, which by the link-and-ratchet motion is given an ascertained movement to each revolution of the plunger-shaft, brings forward the slats one by one over the bed. In this position the canvas and the slat-conveyer are arrested at the delivery of each slat until the riveting mechanism has time to act. The plunger-guide being parallel with and directly above the slats as they are delivered upon the bed it is evident that the staggered outline of the guide will bring the staples, when staples are used, in such position that they will be driven diagonally to the length of the slat, thus securing a stronger hold and lessening the danger of splitting. Now, with the descent of the plungers, a series of tacks, one to each plunger of the gang, is inserted through the canvas web and slat and the points reaching the metallic bottom of the slat-carrier are clinched thereagainst as upon an anvil. The plungers rising, the slat-conveyer moves forward the distance of one slat, and then the plungers again descend, except when the shipper-lever engages its cam, which will be at the time when a sufficient number of slats have been applied to the canvas for the purpose of a single belt or carrier apron, when a suitable length of blank canvas will be drawn off to form the overlapping end, as intimated in the preamble. Then the plungers may be started again. The canvas having been secured to the first slat, the further movement of the conveyer will carry that slat toward the discharge end of the machine, drawing the canvas with it from its reel, thereby serving to feed the canvas a sufficient space for the next slat to be applied, and so on.

It is not intended to limit the invention to the specific devices herein, as it is evident that the details may be greatly altered by any skilled mechanic—as, for instance, any suitable feeding device may be employed which is adapted to convey the slats laterally to the riveting mechanism and hold them beneath the canvas when said mechanism is acting. The plunger-guide can be made of sections arranged in any convenient manner, each having one or more plunger-ways or driveways, and these sections can be distributed so as to vary or make irregular the distance at which the tacks are distributed along the slat. The sorting or collecting hopper can be agitated in any desired way. Any desired tension device can be used to keep the canvas straight and taut. In cases where no slats are to be omitted from the canvas the shipper-lever may be dispensed with, or where it is desired to irregularly space the slats additional cams may be used to throw the plungers out of action intermittently, and various other modifications may be introduced or equivalent devices substituted for those specifically described without departing from the principle of the invention.

I claim—

1. In the tack-driving mechanism, the combination of a transverse head or plunger-guide having a series of guides therein elongated in cross-section and set as to their width or longest diameter obliquely to the length of the head, with correspondingly-arranged plungers which fit and reciprocate in the guides.

2. In the tack-driving mechanism, the combination of a tackway, a driveway having a tack-receiving aperture to which said tackway delivers, a driver or plunger, and a cut-off pivoted in the end of the tackway at said receiving-aperture to arrest the column of tacks and aranged to be tripped as the plunger descends to permit one tack to pass.

3. In the tack-driving mechanism, a tack-delivery device consisting of a driveway having a tack-receiving aperture, a plunger reciprocating in said driveway, a tackway, a cut-off in the end of the the tackway at said aperture, as and for the purpose set forth, and a hook or stop which suspends the tack in the driveway while the plunger is elevated.

4. In the tack-driving mechanism, the combination of the tackway, the throat-piece, the cut-off, the recessed face-plate, the driveway, the spring-stop therein, and the plunger.

5. In a machine for manufacturing conveyer-belts, a slat-conveyer consisting of parallel chains which pass over wheels, and transverse slat-carriers adapted to receive and hold slats and secured to each of said chains to travel with them.

6. In a machine for manufacturing conveyer-belts, the combination of slat-carrying chains, as described, wheels over which they travel, and a pitman which is operated from a shaft and imparts an intermittent rotating motion to the wheels and chains.

7. In a machine for manufacturing conveyer-belts, the combination of a slat-carrier, as shown, with a ratchet-wheel rigid with and a pawl-carrying arm loose on the slat-carrier-driving shaft, and a pitman attached to the pawl-carrying arm and operated from a rotating wheel, so as to give an intermittent motion to the slat-carrier.

8. In a machine for manufacturing conveyer-belts, the combination of an anvil-bed and an independent slat-carrying device which carries the slats onto and over the anvil-bed.

9. In a machine for manufacturing conveyer-belts, the combination, with the slat-conveyer, tack-delivery mechanism, and plunger-shaft, of a shipper in the train of gear which drives said plunger-shaft, and mechanism actuating said shipper intermittently to disengage the plunger-shaft while the conveyer continues to move.

10. In a machine for manufacturing conveyer-belts, the combination of a cam-wheel on the slat-conveyer driving-shaft with a clutch on the plunger-driving shaft and a lever which is pivoted to the frame attached to the clutch and intermittently engaged by the cam, so as to throw the plunger-driving shaft out of gear.

11. In a machine for manufacturing conveyer-belts, the combination of a shaft which moves the slat-conveyer, a shaft which drives the plungers, and mechanism, substantially as described, whereby the shafts are driven with an intermittent motion.

12. The combination, substantially as hereinbefore set forth, of the plunger-shaft, the series of tack-drivers actuated thereby, the loose gear-wheel on said shaft, the clutch between said wheel and shaft, the slat-conveyer, the conveyer-driving shaft, the ratchet-wheel affixed thereto, the link-and-pawl motion by which said wheel is driven from the loose gear, the clutch-shipper, and the cam on the ratchet-wheel, whereby said shipper is intermittently actuated to disengage the gear from the plunger-shaft.

13. In a machine for manufacturing conveyer-belts, the combination of the intermittently-moving slat-conveyer with a series of reciprocating driving-plungers.

14. In a machine for manufacturing conveyer-belts, the combination of an anvil-bed, the slat-carrying device which carries the slats over the anvil-bed, and a series of plungers which drive toward the bed.

15. In a machine for manufacturing conveyer-belts, the combination of driving-plungers with the conveyer which brings the canvas and slats together beneath the plungers.

16. In a machine for manufacturing conveyer-belts, the combination of a driving-plunger with the conveyer which brings the slats beneath the plungers.

17. In a machine for manufacturing conveyer-belts, the combination of an automatic tack-sorting device, a tack-driving device, and a slat and canvas conveyer.

18. In a machine for manufacturing conveyer-belts, the combination of a tack-driving device and a slat and canvas conveyer having an intermittent motion, substantially as described.

19. In a machine for applying slats to webs of canvas, the combination, with means for supplying canvas, of a plunger-guide beneath which the canvas is drawn, arranged transversely to the length of the canvas web and containing a series of driveways, a slat-conveyer and mechanism which actuates it to carry a slat beneath the plunger-guide in proximity to the canvas, tackways feeding to each of the driveways, a gang of plungers working in said driveways, and mechanism actuating said gang to cause it to descend at the moment a slat has been brought beneath.

20. In a machine for applying slats to webs of canvas, the combination, with means for supplying canvas, of a slat-conveyer supplied with a series of metallic carriers, each having a longitudinal channel to receive a slat, mechanism by which the conveyer is intermittently given an onward movement, a plunger-guide arranged parallel with the length of said carriers and having a series of oblique driveways, a series of staple-feeders delivering to said guideways, and a gang of plungers reciprocating in said guideways.

21. In a machine for manufacturing conveyer-belts, the combination, substantially as hereinbefore set forth, with means for supplying canvas, a slat-carrier, and a tack-driving gang, of a suitable guide or presser acting to hold the canvas against the slats for the tacking operation.

22. In a machine for manufacturing conveyer-belts, the combination, substantially as hereinbefore set forth, with means for supplying a web of canvas, of a gang of tack-drivers arranged transversely of the length of such web, a slat-conveyer whereby slats are delivered beneath said gang and parallel therewith, and an adjustable tension device arranged in advance of the tacking-gang to act upon the canvas web.

23. In a machine for manufacturing conveyer-belts, the combination, substantially as hereinbefore set forth, with means for supplying a canvas web, of the slat-conveyer, the tack-driving gang, the tension-roller arranged in advance of said gang to act upon the canvas web, and adjustable boxes for each end of said roller.

24. The combination, substantially as hereinbefore set forth, of the chain-wheels, the chains, the metallic slat-carriers borne by said chains, the anvil-bed over which the carriers are drawn, and the tack-driving gang arranged longitudinally over said bed.

JOHN F. KINGWILL.

Witnesses:
W. F. WIEMERS,
FRANCIS W. PARKER.